United States Patent

Capper et al.

[11] Patent Number: 5,296,646
[45] Date of Patent: Mar. 22, 1994

[54] PROTECTOR MODULE FOR TELEPHONE LINE JUNCTION BOX

[75] Inventors: Harry M. Capper, Harrisburg; James W. Robertson, Oberlin, both of Pa.

[73] Assignee: The Whitaker Corporation, Wilmington, Del.

[21] Appl. No.: 863,626

[22] Filed: Apr. 3, 1992

[51] Int. Cl.⁵ .................... H02H 9/04; H05K 5/02
[52] U.S. Cl. .................... 174/51; 361/119; 379/412
[58] Field of Search .......... 174/51, 52.1, 59; 361/119, 120, 426, 331, 332, 333, 394; 439/404, 405, 188, 709; 379/437, 451, 412

[56] References Cited

U.S. PATENT DOCUMENTS

| | | | |
|---|---|---|---|
| 4,367,907 | 1/1983 | Buck | 439/188 X |
| 4,800,587 | 1/1989 | Kupferschmidt | 361/119 X |
| 4,901,189 | 2/1990 | Merriman et al. | 361/119 X |

Primary Examiner—Mark Rosenbaum
Assistant Examiner—K. V. Nguyen
Attorney, Agent, or Firm—Anton P. Ness

[57] ABSTRACT

A protector module (50) includes a housing (52) having cavities (58) into which are inserted surge protector elements (150). Each protector element upon full insertion engages a deflectable contact portion (82) of a first contact member (80) with an active electrode (156) thereof with the first contact member terminated at a second contact section (88) to a line between a central office and the customer, for providing surge protection to that circuit. In one method of connecting a protector module in a circuit, a second contact member (90) is placed within the cavity (58) connected to the customer service line while the first contact member is connected to the associated but separate line to the central office; when a protector (150) is inserted, it urges the deflectable contact portion of the first contact member (80) into engagement with an underlying contact portion (92) of the second contact member (90); when a protector is absent, service to the customer is interrupted until the protector (150) is replaced.

12 Claims, 15 Drawing Sheets

PROTECTOR MODULE FOR TELEPHONE LINE JUNCTION BOX

FIELD OF THE INVENTION

This relates to the field of electrical connectors and more particularly to junction boxes containing connections of service wires and telephone distribution cable.

BACKGROUND OF THE INVENTION

There are several commercially utilized connectors for providing interconnection between individual wires of service lines for customers to the main distribution cable of a telephone utility company in an enclosure or junction box, usually by means of an intermediate stub cable. The enclosure can be mounted in a ground level pedestal, or within a building, or mounted on an outside wall or a pole. Such enclosures which are for outdoor use must protect the connections from the environment, such as from precipitation, dust, insects, rodents and the like. One example of such an enclosure is sold by AMP Incorporated, Harrisburg, PA. under Part No. 769164 as AMP Quiet Front Pole Mount Terminal, adapted for connection of up to 25 pairs of service wires. Another example of enclosure is also sold by AMP Incorporated, AMP Quiet Front Terminal Closure having Part No. 769147-1 for connection of up to six pairs.

One example of connector for mounting within enclosures is disclosed in U.S. Pat. No. 5,006,077 in which terminal blocks include silos within which are contained respective barrel terminals already terminated to conductors of the distribution cable and are apertured to receive ends of service wires inserted thereinto for termination thereto to define the electrical connection.

In several types of junction boxes for such connectors, overvoltage protector elements are provided on the circuits which protect the circuits of the customer's equipment from energy surges, such as from lightning strikes and the like. Several examples of such protectors are disclosed in U.S. Pat. Nos. 4,158,869; 4,161,762; and 4,133,019. Modules containing such protectors are disclosed in U.S. Pat. Nos. 4,742,541; 4,159,500; 4,613,732 and 4,675,778. The telecommunications industry has established standards for performance and certain dimensional and design requirements for such protectors; one example is Bellcore Technical Reference No. TR-TSY-000070, Issue Feb. 1, 1985 entitled "Customer Station Gas Tube Protector Units".

It is desired to provide a module containing an array of such protectors which can be assembled within an enclosure such that each protector is electrically connected in-line for the circuits interconnected by the terminals of the terminal block contained within the enclosure, upon termination of a service wire to a terminal.

It is further desired that such protector module be sealed against moisture.

SUMMARY OF THE INVENTION

The present invention is a module containing an array of protectors removably contained therein, where the module includes a housing of dielectric material defining protector-receiving cavities into which respective protectors are insertable. The module includes a ground plate disposed across the upper face of the housing body and includes a plurality of openings aligned with the cavities to define the peripheries of the plurality of protector-receiving cavities to become electrically engaged with a first or ground electrode of each protector. At least a first contact is mounted proximate the bottom of each cavity and includes a first contact section exposed within the cavity for electrical engagement with a corresponding second or active electrode of a respective protector. The first contact includes a deflectable arm extending to an enlarged tab disposed transversely near the bottom of the cavity and slightly upwardly therefrom to be engaged by the active electrode protruding from the bottom of the protector establishing assured electrical engagement therebetween with the tab being deflectable downwardly toward the cavity bottom, which assures spring biased electrical engagement with the protector's active electrode. The contact is easily terminatable to an associated conductor wire of a stub cable to which the enclosure is being assembled and to a corresponding terminal for the circuit to be protected by the protector by having an end portion exposed along or extending from the bottom face of the module housing, defining a second contact section. An internal ground strap connects a ground post extending from the ground plate to an external grounding means for the enclosure such as a stud, completing the ground circuit for the protectors necessary for their functioning. A lid of the housing is easily openable for access to the protectors for servicing, self-retains on the housing body upon being opened, and establishes a watertight seal with the housing body upon being closed.

In one embodiment of the invention, a second contact member is mountable proximate the bottom of each protector-receiving cavity with a first contact section disposed beneath the deflectable arm of the first contact member so that the deflectable arm is interposed between the first contact section of the second contact and the active electrode of the protector, and a second contact section extending from the bottom of the housing body for termination to a conductor wire. The tab or first contact section of the first contact member is deflectable downwardly by the electrode of the protector to engage the second contact to complete a circuit between the protector electrode and the first and second contacts. When an associated conductor of the stub cable is terminated to the second contact section of the second contact member and also the first contact member and then to a contact section of the terminal, severing of the portion of the conductor traversing the short distance between the second contact sections of the two contact members opens the circuit between the distribution cable and the service wire, which is closed only by the presence of a protector placed in position in the cavity, assuring that service is interrupted upon the absence of a protector requiring installation of a protector for resumption of service, all in the event that it is desired that the line be protected in order to be functional. If such "missing protector" indicator is not desired for a particular circuit of the enclosure, then the conductor wire is not severed between the first and second contact members for such lines; optionally during assembly the second contact member can simply be omitted, with the protector engaging the first contact member completing the protection for the circuit.

In one embodiment of module, the housing body is securable directly to the terminal block during assembly so that the stub cable conductors can be routed to the terminals of the terminal block after being terminated along their length to the first and second contact members of the protector module, through aligned openings of the side wall of the housing body of the module and the adjacent side wall of the housing body of the terminal block. At each opening can be provided flanges extending outwardly of module side wall, with grooves formed into the flanges along the outwardly facing side and upper surfaces which define channels adapted to receive thereinto edges of openings formed in the side wall of the terminal block housing body to have corresponding shape and dimension. After all assembly and termination of the stub cable conductors to the contact members and terminals, and severing of the conductors if desired, the bottom of both the terminal block and protector module is preferably filled with potting material, thereby embedding and sealing all the wire lengths and connections and exposed terminal and contact portions and also securing together the protector module and terminal block into a unitary part and simplifying handling.

In an alternate embodiment, a third contact member disposed within the protector-receiving cavity includes a spring arm adapted to engage the first contact when a protector is absent, and be deflected out of engagement with the first contact member upon full insertion of a protector into the cavity, with a ground section in grounding engagement with the ground plate of the module and thus with the system ground via the enclosure grounding means, assuring that the circuit to the customer is grounded upon the protector being absent while still opening the circuit to the central office to signify the absence of the protector, providing limited protection to the customer's equipment. Optionally, this arrangement could be utilized to ground the central office line, and leave the customer circuit open.

The lid is adapted to seal around the entire periphery of the housing body upon being closed, by including a resilient downwardly extending peripheral flange having inner and outer wall sections defining an upwardly extending recess therebetween, with the outer wall having an inwardly directed lip entirely therearound. The peripheral flange is forcefittable over a corresponding upwardly and outwardly projecting lip around the upper edge of the side walls of the housing body, with the recess above the inwardly directed lip of the lid flange outer wall section receiving the lip of the housing body upper edge in a snug fit.

The lid may be secured to the housing body by a pair of tabs extending downwardly along the outer side wall of the housing body and through slots of projecting ledge portions integrally molded with the housing body. The tabs have laterally extending latches along side edges thereof proximate the free ends having upwardly facing latch surfaces which prevent the tabs from being pulled upwardly through the ledges once inserted therethrough, retaining the lid to the housing body. The free ends of the tabs can also be molded to extend rearwardly at a right angle to the latches, enabling the lid to be lifted when opened until the free ends engage the bottom surfaces of the ledge portions so that the lid may be easily pivoted backwardly while still remaining secured to the housing body, freeing access to the protector array from interference. Outer edges of the tabs preferably are tapered at the free ends facilitating insertion through the slots during attachment of the lid.

It is an objective of the present invention to provide a module containing surge protective devices, with the module adapted to provide for interconnection with conductors of a stub cable and conductor lengths extending to terminals of a terminal block, defining a unitary assembly adapted for field connection of service wires to the stub cable in an enclosure.

It is also an objective for such a protector-containing module to accept commercially available protectors of several similar designs.

It is a further objective to provide effective sealing of such protector-containing module in a manner permitting field replacement of the protectors, if necessary.

It is yet a further objective to provide one or more positions in such a protector-containing module with means for assured indication of the absence of a protector along a particular circuit by opening the circuit preventing unprotected use until a protector is placed into the circuit thus closing the circuit.

It is also an objective to provide a lid for a protector-containing module which is adapted to remain attached to the module after being opened, and remain opened in a position to provide clear access to the protector array during servicing.

Embodiments of the present invention will now be discussed by way of example with reference to the accompanying drawings.

DETAILED DESCRIPTION OF THE PREFERRED EMBODIMENT

Figure 1:
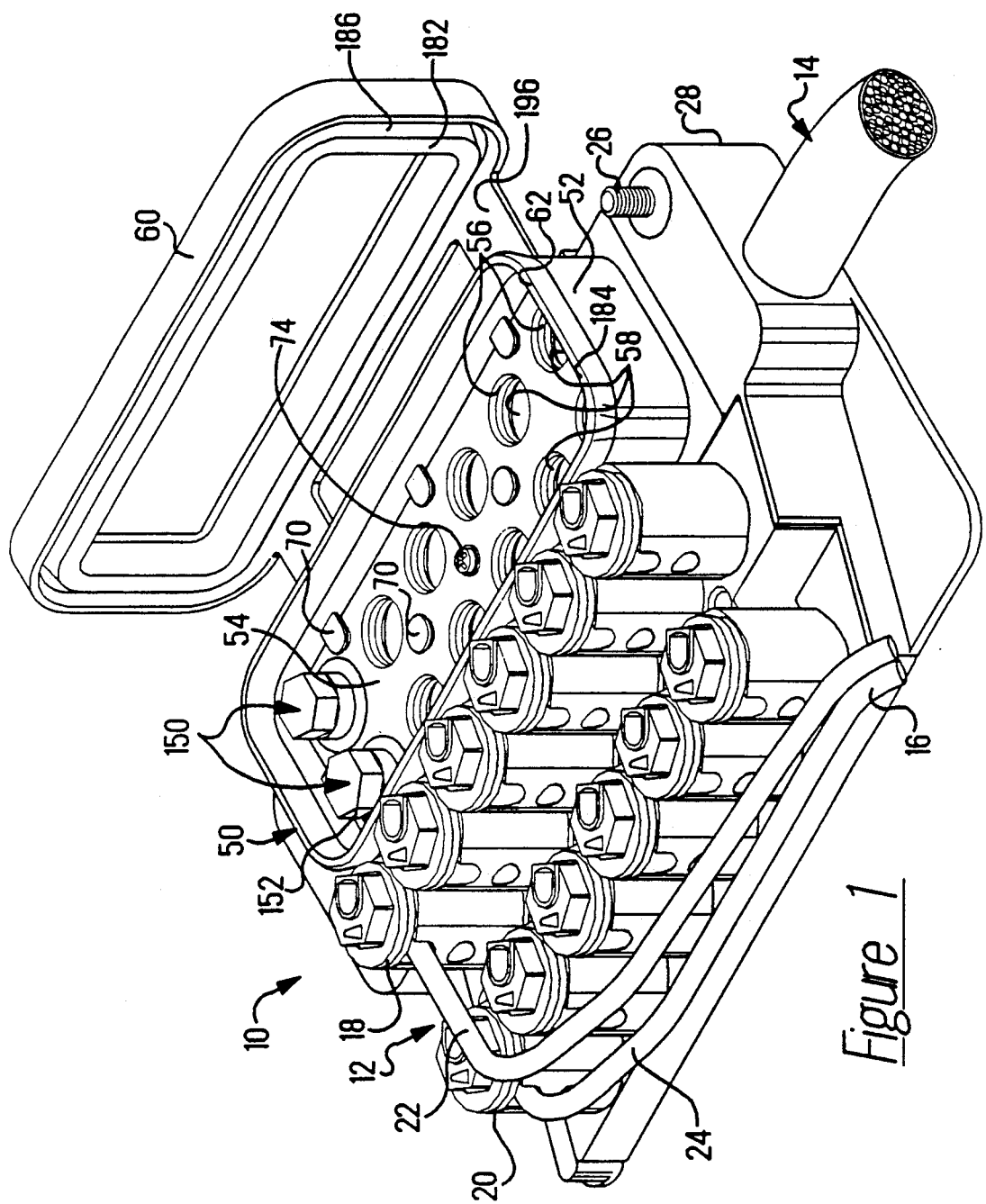
FIG. 1 is an isometric view of a protector module of the present invention assembled to a corresponding terminal block, with the lid of one shown open exposing several protectors in position, and a stub cable and representative customer line assembled thereto.

FIG. 1 is illustrative of a completed enclosure 10 containing a terminal block 12 within an enclosure housing, and a protector module 50 also assembled therewithin, all electrically connecting conductors of stub cable 14 to discrete customer lines such as representative line 16 to provide telephone service between a central office and the customers. Terminal block 12 includes a plurality of paired discrete housing sections 18,20 within which are respective terminals interconnecting respective wires 22,24 of customer lines 16 with respective conductors of stub cable 14. One or more of customer lines 16 may be protected against voltage surges by protectors 150 contained within protector module 50 and electrically connected to the circuit comprising the customer line and the conductors of the stub cable. Protectors 150 are in grounding engagement with ground plate 54 secured across the top of dielectric housing 52 of protector module 50, and extend through respective holes 56 therethrough into cavities 58 of dielectric housing 52, with ground plate 54 being electrically connected to ground stud 26 mounted in an end cap 28 which is itself easily connected to ground by a ground wire (not shown). Lid 60 environmentally seals protectors 150 and ground plate 54 when closed onto upper wall section 62 of dielectric housing 52.

Figure 2:
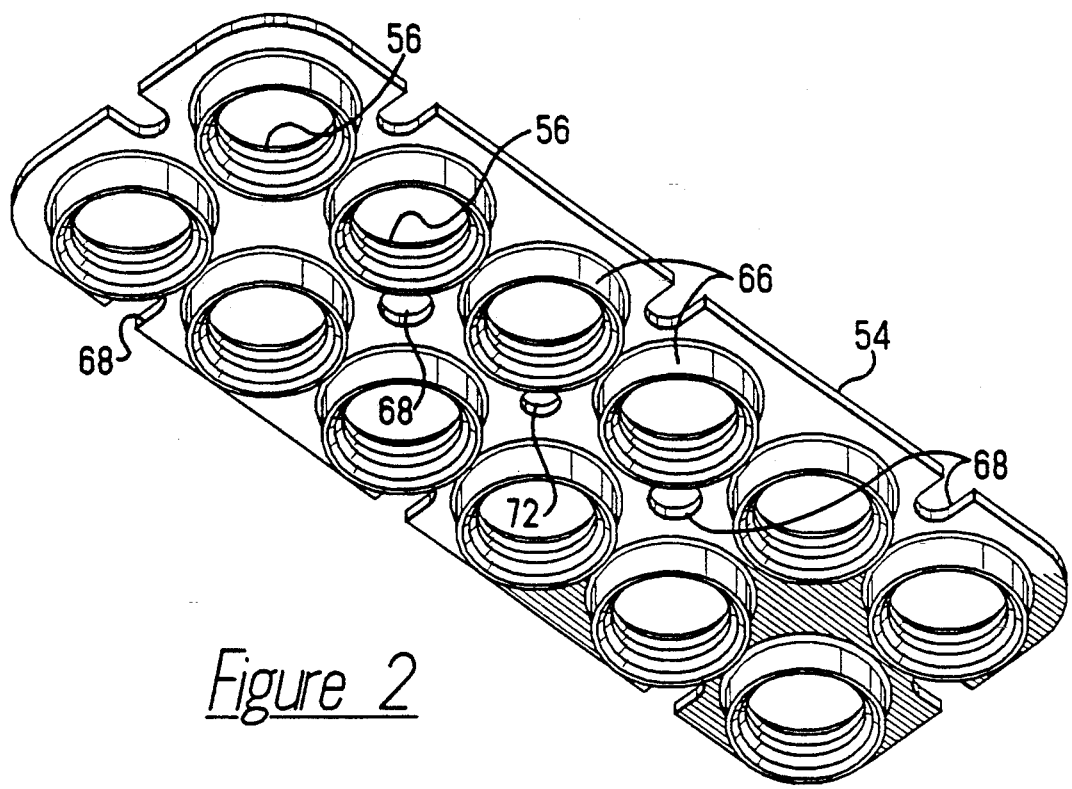
FIG. 2 is an isometric view of the ground plate of the protector module, illustrating the internally threaded flanges.

Ground plate 54 is shown in FIG. 2 having a transverse body section 64 with holes 56 therethrough around which are annular flanges 66 which extend partially into respective cavities 58 of housing 52. Annular flanges 66 are internally threaded for threaded insertion thereinto of respective protector members 150 by rotation of hexagonally shaped lugs 152 thereof until flanges 154 engage ground plate 54 and establish a grounding engagement therewith. Mounting recesses and holes 68 permit plastic bosses 70 of housing 52 to extend upwardly therethrough during assembly, after which the bosses are heat staked or ultrasonically staked to secure ground plate in position in the housing across the top surface thereof. Hole 72 centered in body section 64 enables a ground stud 74 (FIGS. 1 and 8) to be secured therein to extend to a ground strap 76 (FIGS. 12 to 15) mounted across the bottom of housing 52 to ground stud 26 of module 10 when protector module 50 is assembled to terminal block 20.

Figure 3:
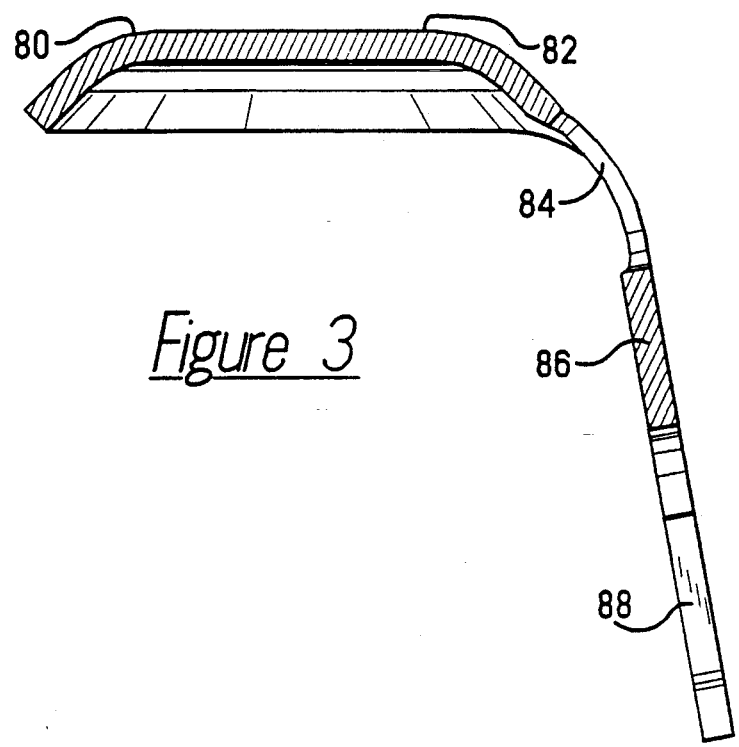
FIGS. 3 and 4 are isometric and cross-section views of the upper contact member of a protector position.
Figure 4:
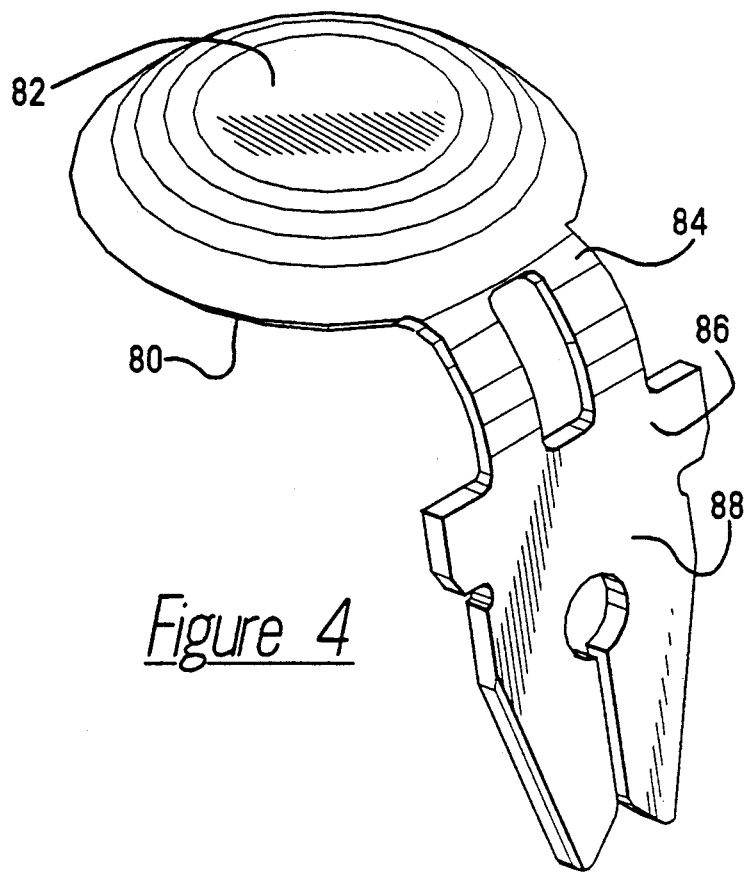
Figure 5:
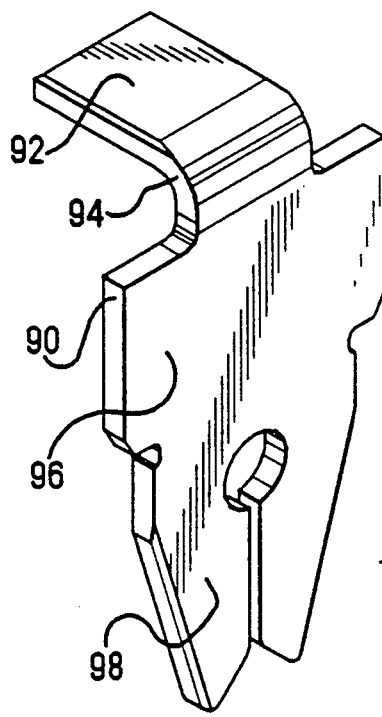
FIG. 5 is an isometric view of the lower contact member.
Figure 6:
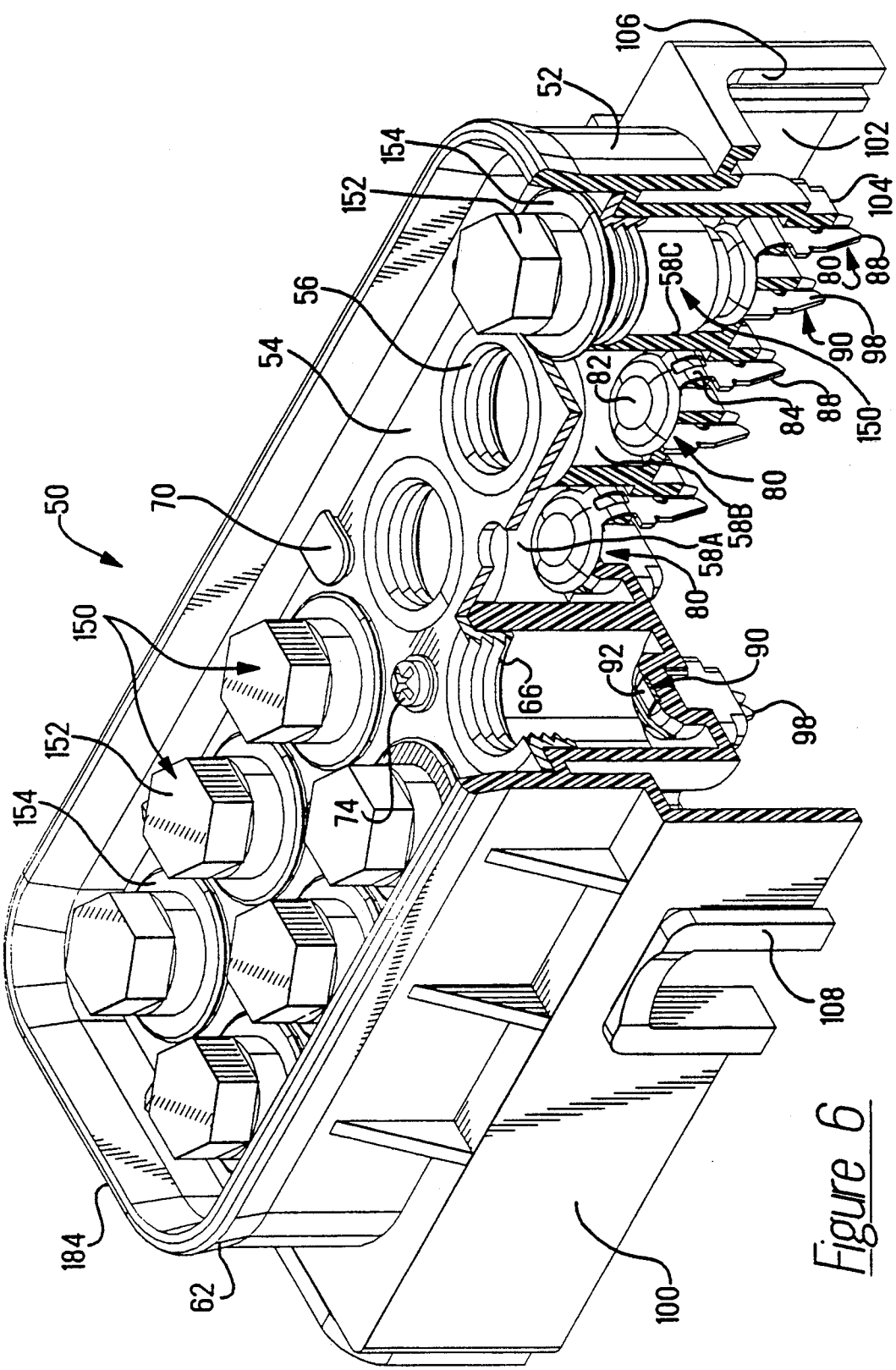
FIGS. 6 and 7 are isometric views from different angles of the protector module housing body of FIG. 1 with ground plate and partially broken at several protector sites to illustrate both contact arrangements wherein the upper contact alone is used and also wherein both upper and lower contact members of FIGS. 3 to 5 are secured in position, and a protector mounted in place engageable with the upper contact and urging the upper contact into engagement with the lower contact where both contacts are installed with wire segments severed between the two contacts for "missing protector" indication.
Figure 7:
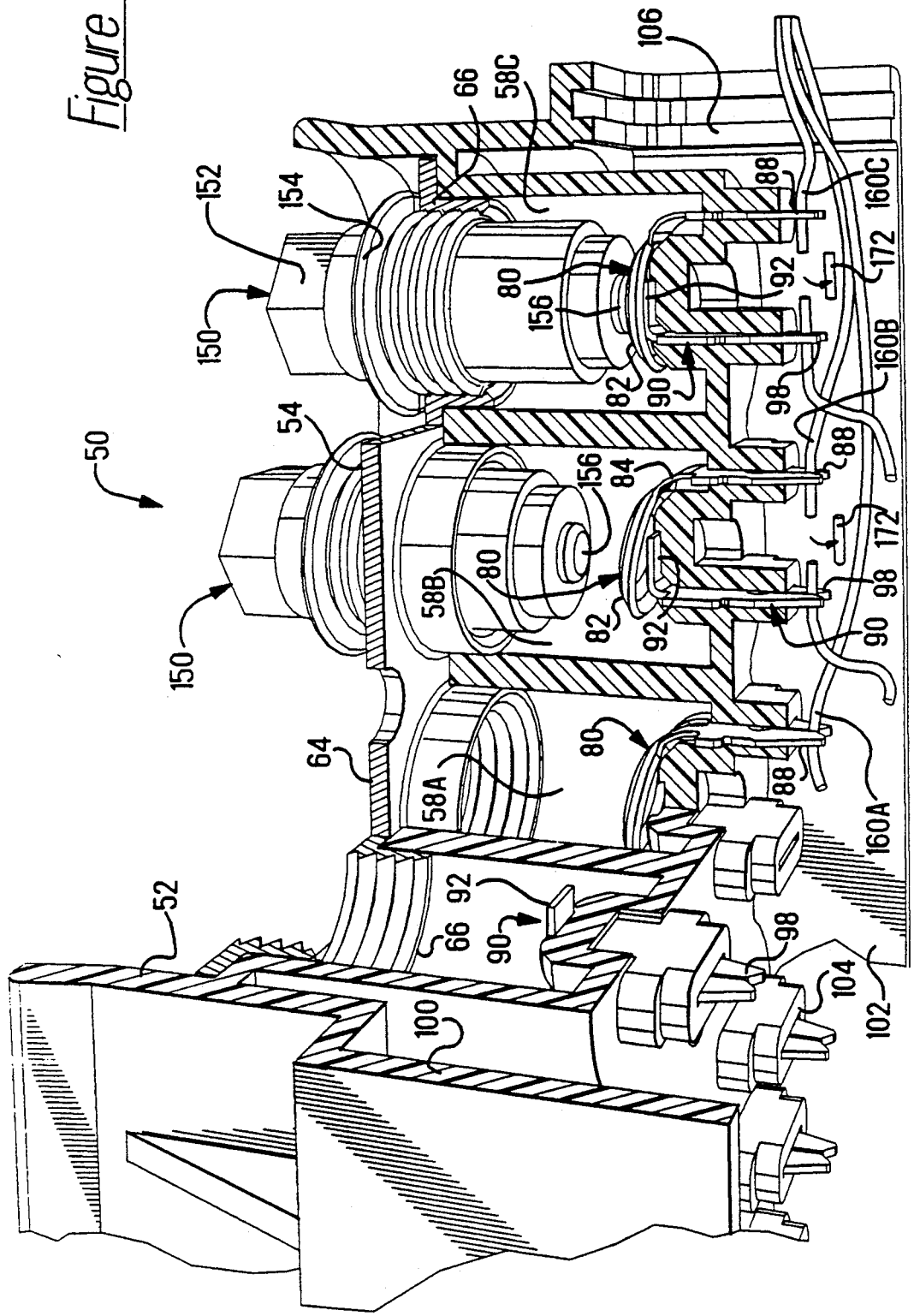

In FIGS. 3 and 4 a first or upper contact member 80 is illustrated which is associated with a respective protector 52 and will be disposed in a respective cavity 58 of module housing 52, as seen in FIGS. 6 and 7. Upper contact member 80 includes relatively transverse upper or first contact section 82 which preferably is an enlarged round dome-shaped tab joined at an angle at bend 84 to intermediate section 86, which concludes in lower or second contact section 88; the angle may be from about 75° to about 85°, such as about 80° so that first contact section 82 is angled between 5° and 15° and preferably about 10° from horizontal. Use of the upper contact section disposed on a deflectable spring arm generates a spring bias to the engagement with the protector electrode for assured electrical engagement, and also compensates for tolerances. Similarly, second or lower contact member 90 of FIG. 5 includes a transverse first contact section 92 joined at bend 94 to intermediate section 96, which concludes in second contact section 98. In certain circuit arrangements such a second or lower contact member 90 is utilized cooperable with upper contact member 80, providing for "missing protector" indication.

In FIGS. 6 and 7 upper contact 80 has been secured in each cavity 58 of housing 52 so that first contact section 82 is disposed transversely across the bottom of cavity 58 and angled upwardly to be initially spaced from and over the cavity bottom. A portion of lower side wall 100 of housing 52 is shown broken away to expose a portion of wire cavity 102 beneath bottom face 104, and second contact sections 88 are seen extending outwardly from bottom face 104 beneath each protector site. Lower side wall 100 also includes cable opening 106 for receipt of stub cable 14 therethrough (see FIG. 1), with individual conductors thereof extending to and being terminated to second contact sections 88 of upper contact members 80 such as by conventional insulation displacement techniques. Lower side wall 100 also includes conductor openings 108 for individual conductor wires to extend from second contact sections 88 to corresponding terminals in terminal block 20 (see FIG. 13).

In cavity 58A of FIGS. 6 and 7 only the upper contact member 80 is shown in place, with first contact section 82 extending transversely at the bottom of the cavity. In cavities 58B and 58C the lower contact member 90 is also shown in place, with first contact section 92 extending transversely across the center pedestal of the bottom of cavity 58B and slightly raised above the pedestal surface, beneath first contact section 82 of the associated upper contact member 80. Upper contact member 80 is preferably of metal having spring properties such that after the contact arrangement has been placed into in-service use and a protector used and then removed and the upper contact spring arm subjected to stress and having taken a set, generally a gap or spacing of about 0.010 inches or more is generated between the upper and lower contacts. Such an upper contact member may be made for example from high strength modified copper alloy such as Alloy No. C194 having superior stress relaxation properties.

In cavity 58C a protector 150 is shown fully in place, threaded into annular flange 66 of ground plate 54; active or lower electrode 156 of protector 150 has engaged upper contact member 80 at first contact section 82 thereof and deflected first contact section 82 downwardly about bend 84 until engaged with underlying first contact section 92 of lower contact member 90 at the lower surface of the center of the dome-shaped tab. With respect to cavity 58A, a protector when inserted will engage the upper contact member 80 to be joined to a corresponding conductor 160A of the stub cable via second contact section 88. With respect to cavities 58B,58C, conductors 160B,160C have been terminated to both second contact sections 88,98 of the pairs of contact members, and the sections of wires 172 have been severed and removed thus opening the circuits between the respective ones of each pair of first and second contact members.

Figure 8:
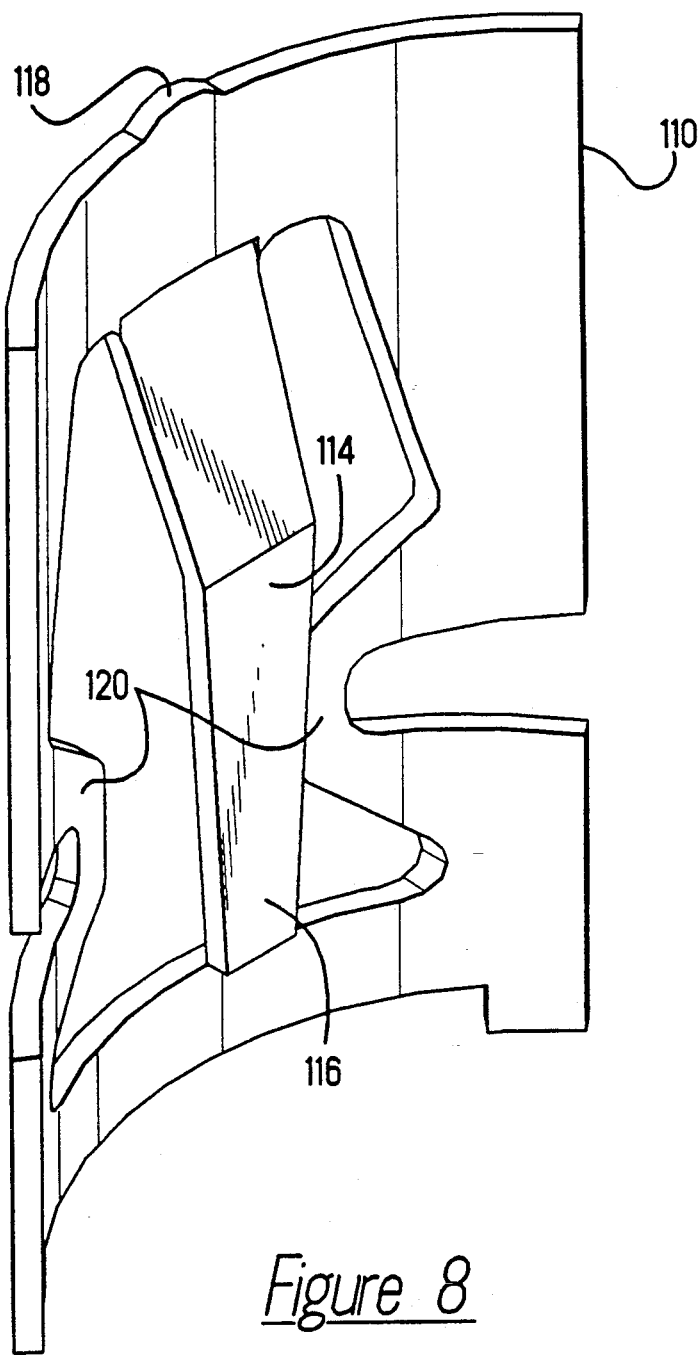
FIGS. 8 to 10 are isometric and enlarged section views of a third optional contact member of FIG. 8 inserfable into a protector-receiving cavity to shunt the first contact to ground in the absence of a protector as in FIG. 9, with FIG. 10 showing a protector fully inserted and deflecting the shunt arm out of grounding engagement with the first contact, and also showing alternative embodiments of lower contact and ground plate and housing therefor.
Figure 9:
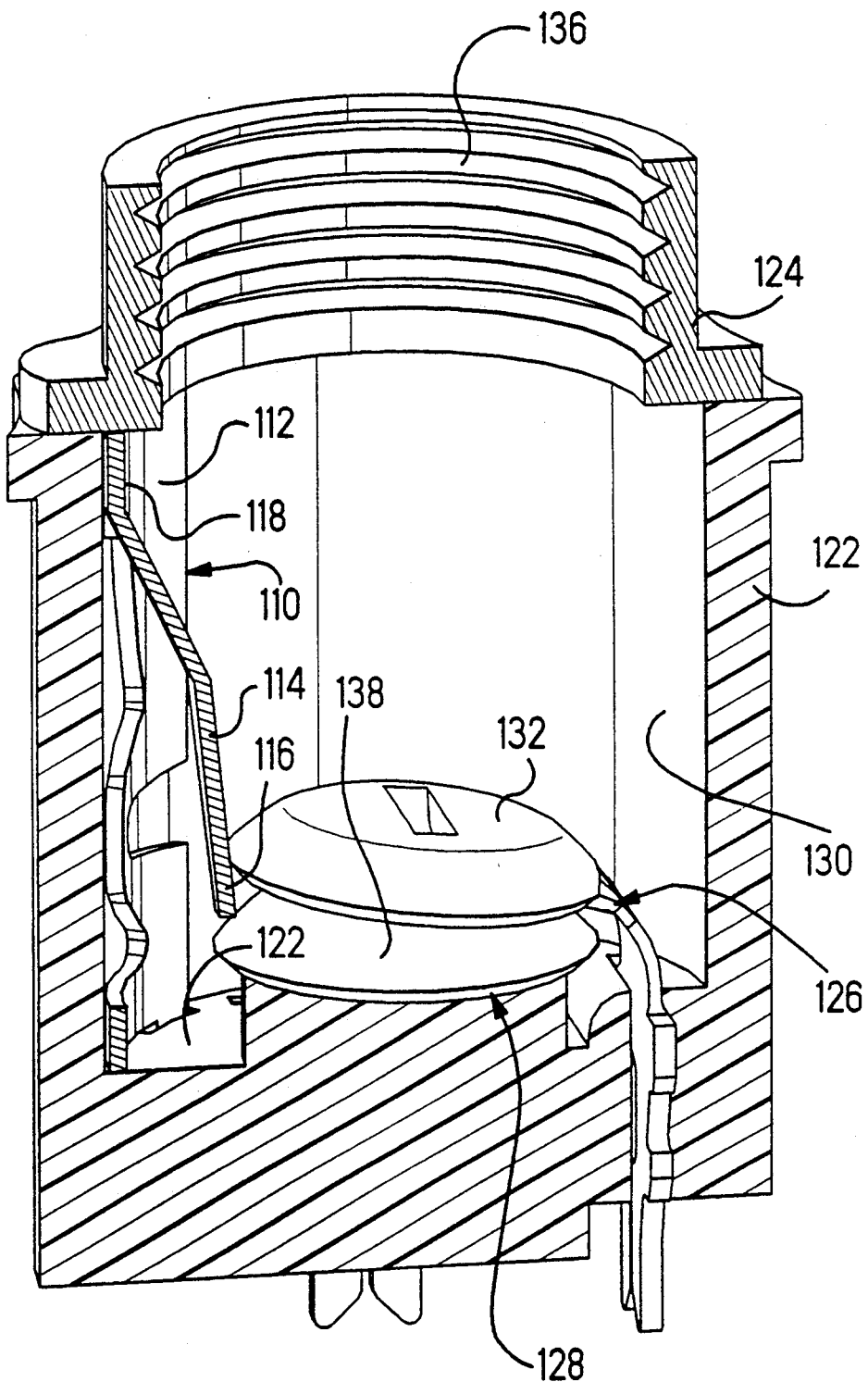
Figure 10:
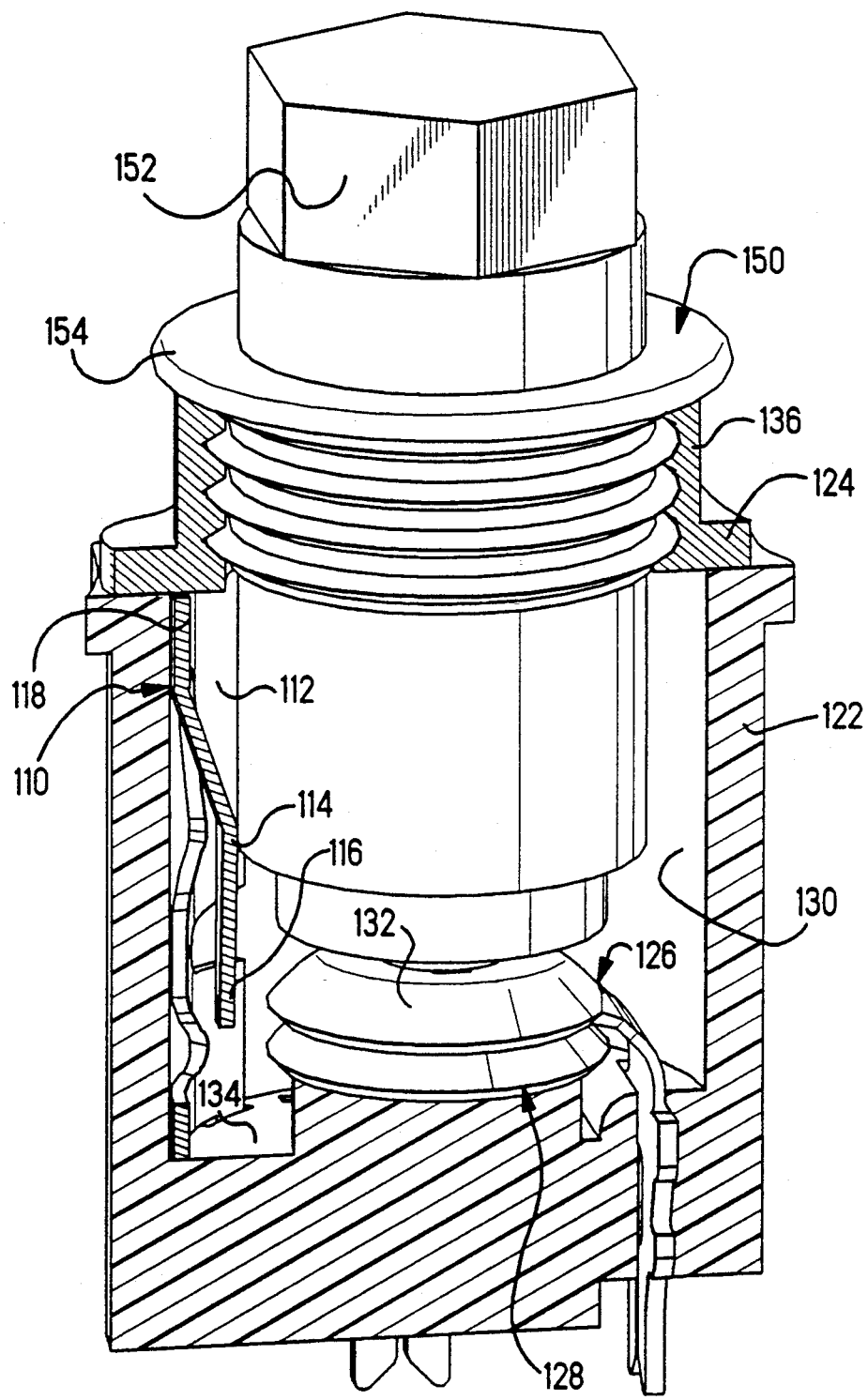

Referring to FIGS. 8 to 10, a third or ground contact member 10 may be utilized to enable indication of the absence of a protector from a protector-receiving cavity; also shown in FIGS. 9 and 10 is an another embodiment of protector module housing 122, ground plate 124, and upper and lower contacts 126,128. Semicylindrical body section 112 is disposed along a side wall of each protector-receiving cavity 130 of housing 122, and includes a spring arm 114 extending downwardly and radially inwardly from the cavity side wall to a free end 116. When no protector is in position in cavity 130, free end 116 of spring arm 114 is spring biased against an edge portion of first or upper contact section 132 of upper contact member 126 while an embossment 118 engages a lower surface of ground plate 124 when the ground plate is assembled into the housing in a manner similar to ground plate 54 in housing 52 of FIG. 1. Embossment 118 is spring loaded against ground plate 124 by virtue of serpentine spring sections 120 being compressed when semicylindrical body section is compressed between ground plate 124 and cavity bottom 134.

Also in FIGS. 9 and 10 upper and lower contact members 126,128 are both similar in shape to upper contact member 80 of FIGS. 3 and 4. Ground plate 124 is shown similar in structure to ground plate 54 of FIG. 2 but essentially inverted with annular flanges 136 extending upwardly for precisely machined ends thereof to engage flanges 152 of protectors 150. In a module using the ground plate 54 of FIGS. 6 and 7 with annular flanges 66 extending downwardly into respective cavities 58, such an embossment 118 of a ground contact 110 would engage the leading edge of the corresponding annular flange.

In FIG. 9 upper contact section 132 is undeflected by a protector electrode 156 as in FIG. 10 and is not in engagement with first contact section 138 of lower contact member 128 thus opening the circuit. Ground contact 110 thus establishes a ground path between the upper contact member 126 and ground plate 124 and ultimately to ground when spring arm 114 is undeflected by the body of a protector 150 which can be utilized as a signal to the central office of a "missing protector" from the circuit, since upper contact member 126 is connected to a stub cable conductor when fully installed. Such feature is functional for grounding the respective circuit whether or not the upper contact member is used alone or in cooperation with a lower contact member and severing of the associated stub cable conductor between the contact members.

Figure 11:
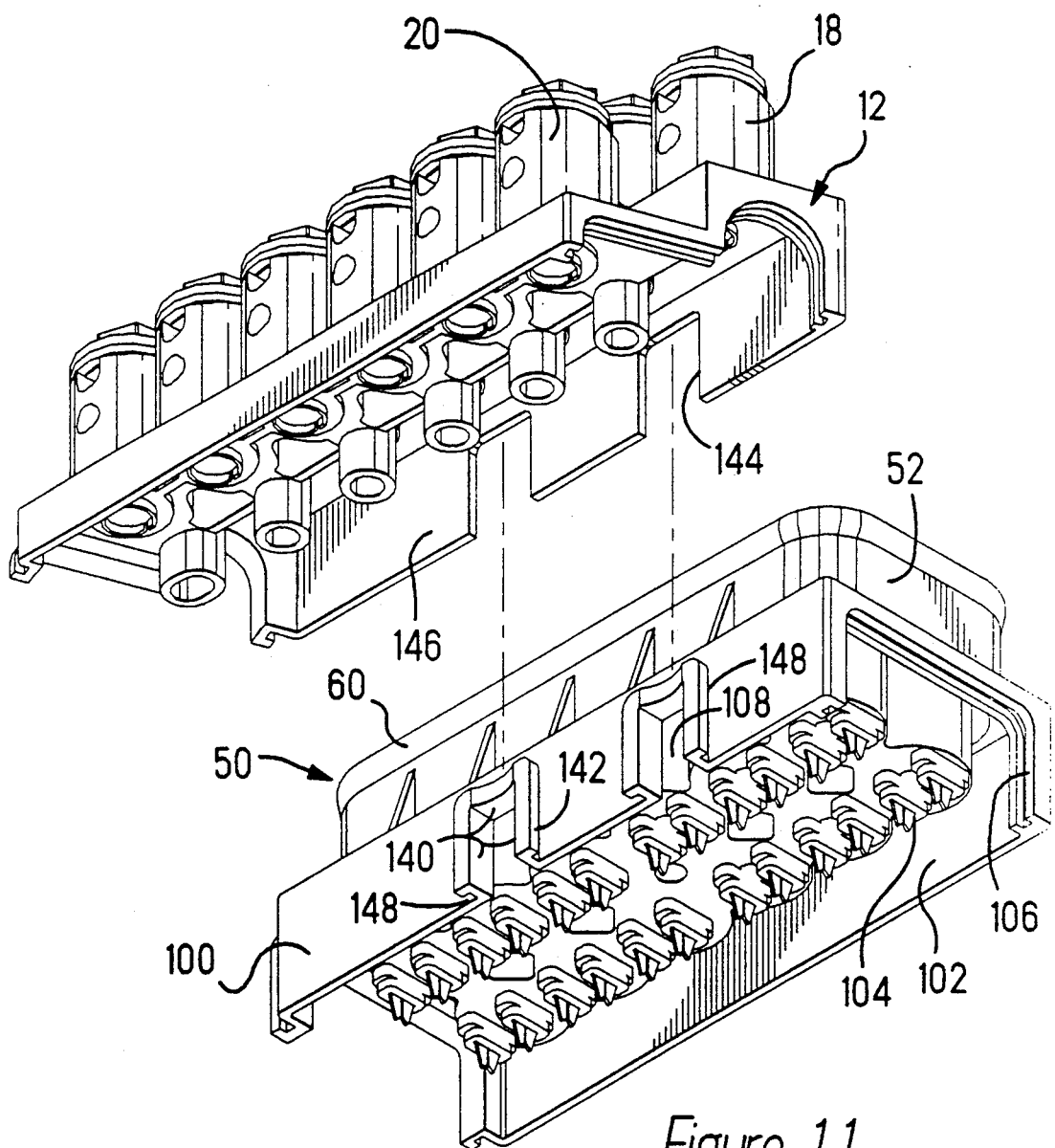
FIGS. 11 to 13 are bottom isometric views of the protector module housing body with the terminal block housing of FIG. 1 exploded therefrom and in position for being fastened together for further processing of the assembly in FIG. 1, and along with a ground strap and contact members assembled to the protector module and terminals is shown assembled to the terminal block and end caps in FIG. 12, and with several conductors of the stub cable shown terminated to the pairs of contact members of the protector module and also to the terminals of the terminal block in FIG. 13, with one thereof severed between the contact members for "missing protector" indication.
Figure 12:
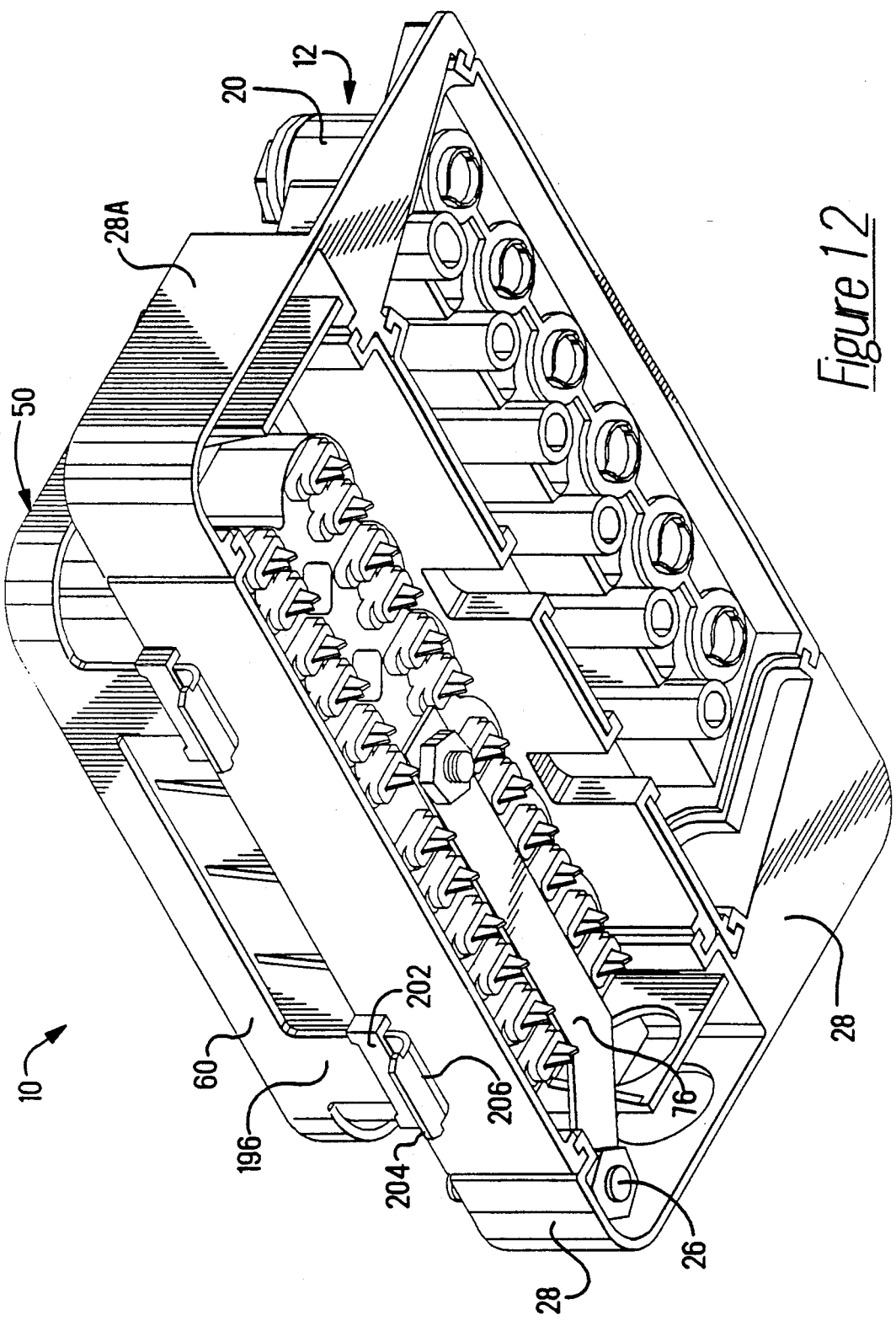

Assembly of protector module 50 to terminal block 12 can be performed in the following manner, referring to FIGS. 11 to 13. Lower side wall 100 of module housing 52, at conductor openings 108, includes outwardly extending flanges 140 which include lip portions 142 extending transversely away from the opening. Terminal block 12 includes corresponding openings 144 through lower side wall 146 which are shaped and sized to be received in the outwardly facing channel 148 defined by the lip portions 142 as terminal block 12 is lowered alongside module housing 52, as seen in FIG. 12 in which end caps 28,28A are also seen after being similarly assembled to the module housing and the terminal block using flanges having channel-defining lip portions. Terminal block 12 can thus be held in proper position with respect to protector module housing 52 during further assembly and termination of conductors of the stub cable to the contacts of the protector module 50 and the terminal block 12, as indicated in FIG. 13.

Figure 13:
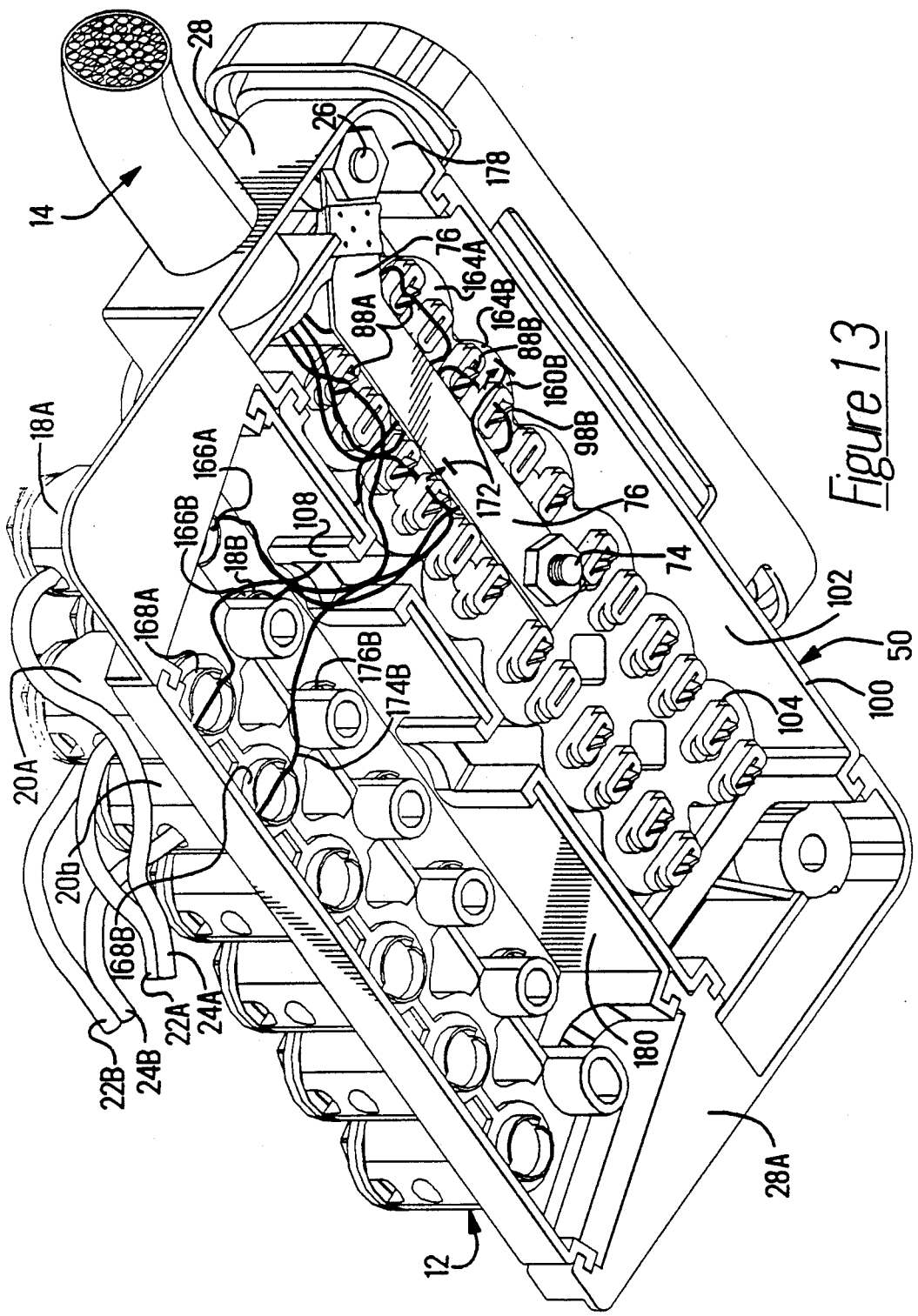

Wiring of the discrete conductors of stub cable 14 is shown in FIG. 13 along bottom face 104 of module housing 52, with the conductor wires being disposed within wire-dressing cavity 102 defined by side walls 100 and walls of end caps 28,28A. Two wiring arrangements are shown for demonstration purposes although ordinarily only one arrangement would be used in any particular protector module 50, for all protector sites of that module. A representative first associated pair of conductor wires 160A,161A is shown corresponding to the first pair of protector sites 164A,166A of protector module 50 and the first pair of terminal sites 18A,20A of terminal block 12 and first pair of customer wires 22A,24A. Cable conductors 160A,161A are terminated by insulation displacement techniques in the slots of second contact section 88A of the upper contact members of protector site 164A,166A, then extending continuously through wire opening 108 to be terminated to the lower contact sections of terminals 168A,170A of terminal sites 18A,20A. The electrical circuit defined from the stub cable to the customer wires 22A,24A is continuous in nature, and even in the absence of a protector in the protector sites 164A,166A service to the customer will be uninterrupted.

Another arrangement is possible, wherein service is intentionally interrupted should protectors be absent from the protector sites, with the utilization of both the upper and lower contact members as a cooperable pair. This is illustrated by conductors 160B,162B of stub cable 14 extending to terminations with second contact sections 88B at protector sites 164B,166B. While initially extending to second contact sections 98B and onwardly to terminals 168B,170B at terminal sites 18B,20B, the portions 172 of conductors 160B,162B between associated second contact sections 88B,98B at both protector sites 164B,166B are severed and removed, thus electrically isolating the stub cable-side of the protector sites 164B,166B from the terminal side, which is now electrically connected to the terminals 168B,170B of terminal sites 18B,20B by nowdiscrete wire lengths 174B,176B. Optionally the conductor element can be severed between the terminations with the second contact sections without removal of a discrete portion, in which case the two portions adjacent the severing are bent away from each other to assure an electrical discontinuity. Thus were a protector to be absent from such a protector site, the circuit would be open and service interrupted because the upper or first contact section 82 of the upper contact member 80 of the protector site will not be in engagement with the first contact section 92 of lower contact member 90, as shown in FIGS. 6 and 7 at cavities 58B. However, with a protector 150 properly mounted in position such as in cavity 58C, the upper and lower contact members 80,90 will be in electrical engagement thus completing the circuit. It is also possible to utilize the upper and lower contact member arrangement without severing the conductor therebetween thus rendering the lower contact member redundant, in order to provide uniform manufacturing techniques of protector modules prior to wiring.

In FIG. 13 the foil shield 178 of stub cable 14 is seen terminated to ground stud 26 by being secured to a terminal having a ring contact section disposed around the post section of the ground stud. Ground strap 76 is also seen extending to ground stud 26 which extends through a hole at the end thereof, with ground strap 76 connected to ground post 74 extending through protector housing 52 to bottom face 104 from ground plate 54 of the protector module. After termination of all conductors of stub cable 14 to respective contacts of the protector sites and terminal sites along the bottom face of the protector module 50 and the terminal block 12, and severing performed if desired, the wire dressing cavity 102 and related cavity 180 of terminal block 12 is filled with potting compound such as polyurethane sealing the terminations, securing the conductor wires in place and also providing strain relief protecting the terminations.

The protector module 50 can be programmed that where customer lines are provided surge protection, customer service can optionally be designed to be either interrupted or uninterrupted in the absence of protectors at the protector sites associated with the terminal sites. Also the protector sites can be provided with ground contacts which will provide grounding in the event of the absence of a protector in a protector-receiving cavity of a protector site; such grounding can enable a signal to be automatically generated which will notify the central office of the absence of a protector where one is intended.

Figure 14:
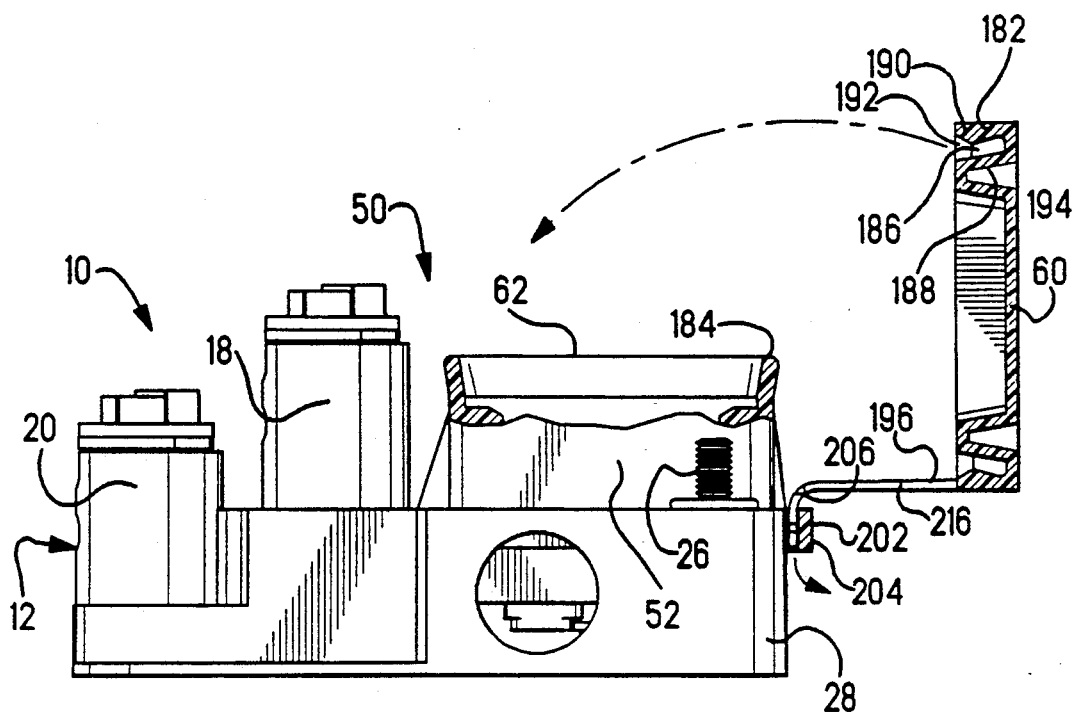
FIGS. 14 and 15 are partial cross-section views of the protector module showing the lid in open and closed positions respectively.
Figure 15:
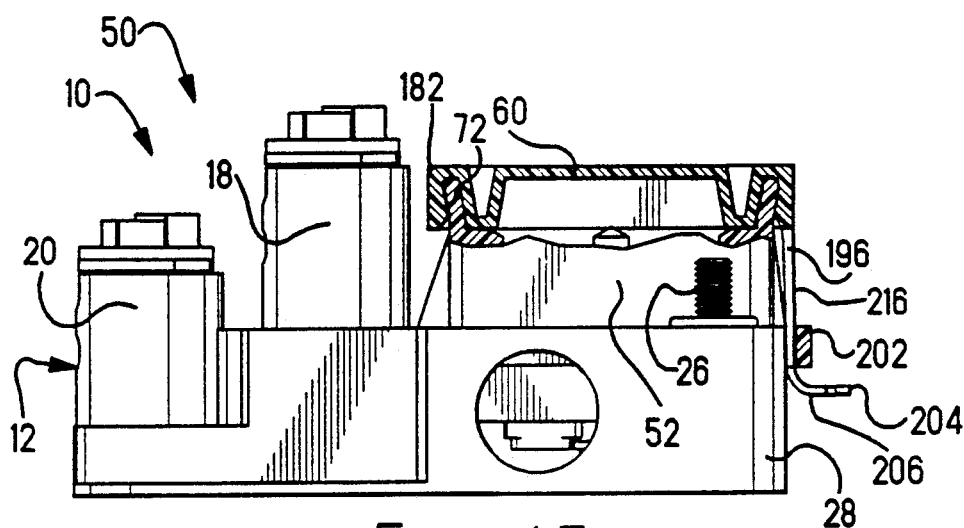
Figure 16:
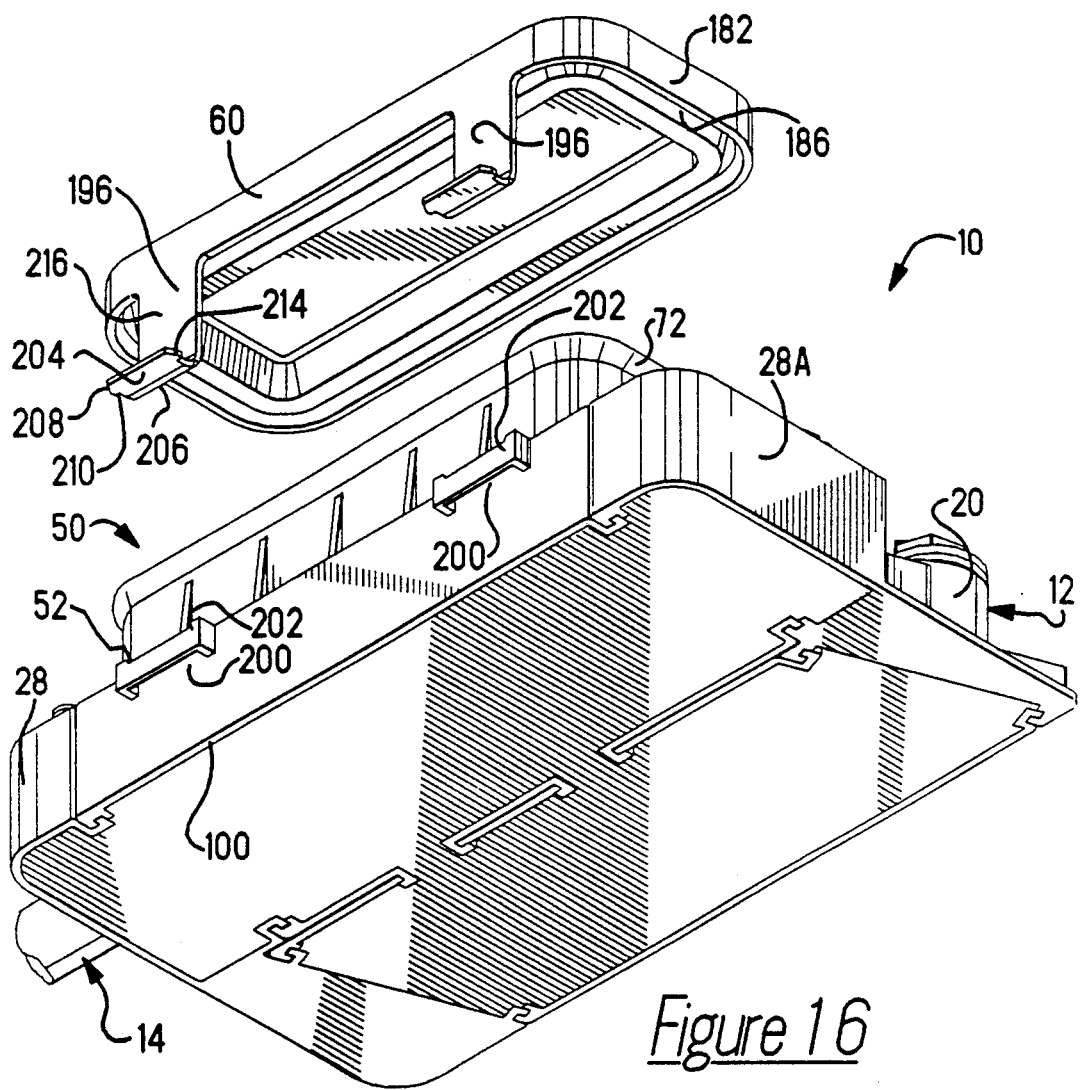
FIGS. 16 and 17 are isometric views from rearward and below the protector module housing body showing the lid being assembled thereto.
Figure 17:
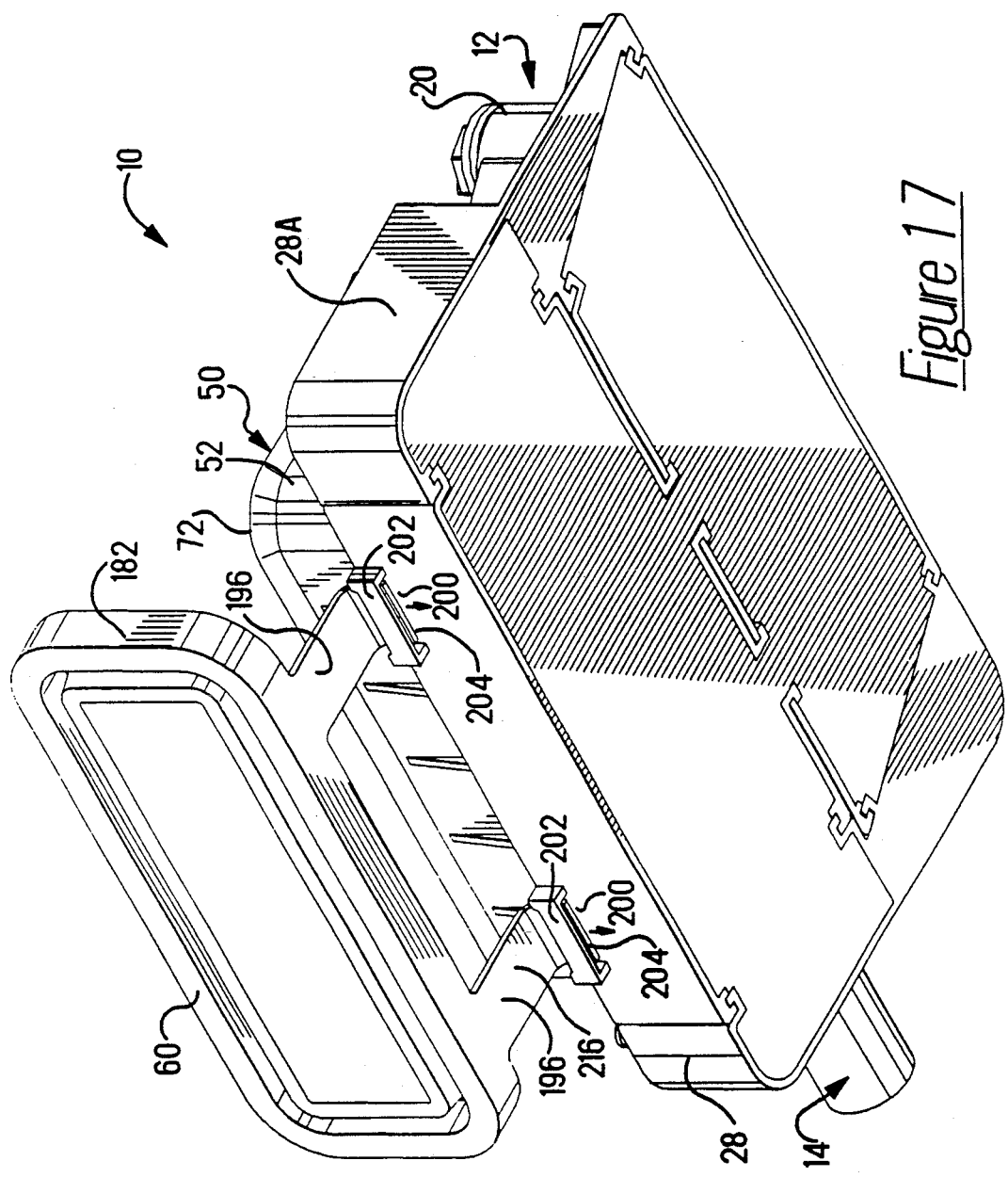

Sealing of the protector module from the environment is desired. Bottom face 104 of the module is sealed by potting material as shown in FIG. 17. The top surface is environmentally sealed by appropriate sealing fit of lid 60 to module housing 52 and protecting ground plate 54 and lugs 152 at the upper ends of protectors 150 in a manner which also permits lid 60 to be opened for access, as shown in FIGS. 14 and 15 and also referring to FIGS. 1 and 6.

The system of sealing is disclosed in U.S. Pat. Application Serial No. 07/862,677 filed Apr. 3, 1992 and assigned to the assignee hereof. Such a sealing fit is obtained as a result of the particular cooperating structures of the periphery 182 of lid 60 and wall section 62 of housing 52, with lid 60 comprised of resilient elastic material such as a copolyether elastomer as is sold by General Electric Company under the designation LOMOD FR5030A or optionally of a resilient plastic material, with housing 52 preferably composed of a relatively rigid plastic material such as a blend-of acrylobutyl styrene and polyvinylchloride polymers.

Wall section 62 of housing 52 preferably is canted to extend slightly outwardly at an angle of between about 2° to about 15° such as about 10° to rounded edge surface 184. Periphery 182 of lid 60 preferably defines a lip having an edge-receiving channel 186 thereinto canted upwardly and outwardly at a similar angle of between about 2° to about 15° such as about 10° and thus is complementary to wall section 62 of housing 52, with the width of channel 186 being dimensioned to form a tight fit with wall section 62 when mated therewith. Channel 186 is defined between an angled inner wall 188 and an angled outer wall 190 parallel thereto, and preferably a leading 192 at the channel entrance is provided assisting angled wall section 62 of housing 52 to enter canted channel 186 the center of which is otherwise offset slightly inwardly from the center of edge surface 184 of canted wall section 62, since the bottom 194 of channel 186 is vertically aligned with respect thereto substantially entirely peripherally around housing 52 thus being offset outwardly from the channel entrance. With lid 60 being made of resilient material, angled outer wall 190 is elastically deflectable outwardly as edge surface 184 enters canted channel 186, with deflection initiated by bearing engagement of rounded edge surface 184 with leadin 192, as lid 60 is closed onto housing 52 with moderate pressure easily manually applied. Also outer wall 190 may be angled toward inner wall 188 at the entrance to define a constriction narrower than the thickness of canted wall section 62 assuring tight engagement without inhibiting receipt of the upper edge into the channel.

Figure 18:
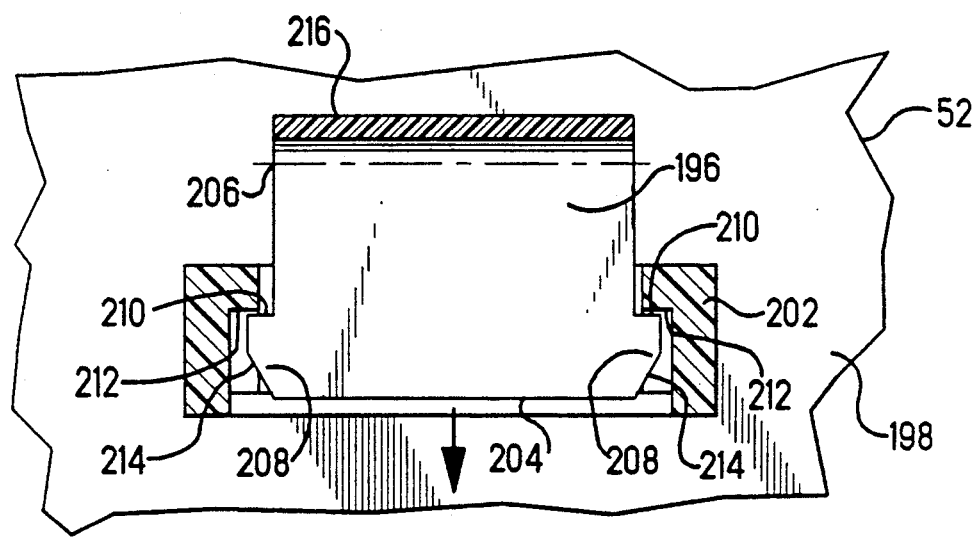
FIG. 18 is an enlarged view of a lid tab latched in a housing slot.

Lid 60 is secured to housing 52 in a manner disclosed in U.S. Pat. No. 5,186,661. Referring to FIGS. 15 to 18 and also FIG. 12, lid 60 includes a pair of hinge tabs 196 extending downwardly therefrom along rear surface 198 of housing 52 of protector module 50 and are inserted into corresponding vertical slots 200 formed through horizontal ledge sections 202 along rear surface 198. Hinge tabs 196 each preferably include a free end 204 extend around a right angle bend 206 with outwardly extending latching projections 208 defining latch surfaces 210 which are latchingly engageable with downwardly facing surfaces 212 of ledge sections 202 of housing 52. Hinge tab 196 is insertable into slot 200 from above, with angled outwardly facing surfaces 214 bearing against inside surfaces of ledge sections 202 at ends of slot 200, initiating elastic deformation of free ends 204 by reason of the resilient material from which lid 60 is made. After latch projections 208 pass below downwardly facing surfaces 212, free end 204 resumes its normal undeformed state and latch surfaces 210 opposed from downwardly facing surfaces 212 as shown in FIG. 18. Thereafter lid 60 remains attached to housing 52 even when opened.

Body sections 216 of hinge tabs 196 are of a length such that free ends 204 and bends 206 are disposed spaced from beneath slots 200 when lid 60 is closed onto housing 52. Bends 206 permit lid 60 to be rotated backwardly when fully opened as free ends 204 enter into slots 200 from below thereof but prevent hinge tabs 196 from being pulled completely upwardly through slots 200. The bends 206 preferably are a right angle and may be up to 180° to retain lid 60 in its rotated back opened position clear of housing 52 allowing easy access to protectors therein, as illustrated in FIGS. 1 and 14.

The protector module of the present embodiment is adapted to be used with protector elements of any of several existing commercial designs which are in accordance with Bellcore specifications. The module is sealable against moisture, is programmable electrically in several manners, is easily used with a terminal block also modular as described to define a terminal block for protected circuits, and enables easy access to the protectors for service and repair. Variations and modifications may occur which are within the spirit of the invention and the scope of the claims. For example, the ground plate may be configured with upwardly extending annular flanges which provide even further assurance against moisture entering the protector cavities, so long as the upper edge of the flanges is precisely machined to an appropriate length to position the abutting flanges of the protectors for the electrode to engage the upper contact member at the bottom of the cavity and close the gap with the lower contact member. The lid may also be fastened in a different manner or may have a different manner of sealing with the module's housing.

We claim:

1. A circuit protection module for interposing along an array of conductors and adapted to receive thereinto and contain protector elements for circuit surge protection electrically connectable to respective circuits of said conductors to provide grounding for voltage surges therealong and being of the type having an active electrode exposed along a bottom thereof and a ground electrode therearound spaced a known distance from said active electrode, comprising:

housing means including cavities extending thereinto from an insertion face thereof and adapted to receive thereinto respective ones of said protector elements, a ground means having an exposed portion adjacent each said cavity and extending along said insertion face and at least to each said cavity, and said housing means further including at least a first contact member retained in each one of said cavities isolated from said ground means;

each said first contact member including first and second contact sections, said first contact section extending upwardly into said cavity and substantially transversely thereacross on a bendable spring arm, thereby being adapted to be engaged by an active electrode of a said protector element and deflected downwardly upon full insertion of a said protector element in said cavity and said second contact section adapted to be electrically connected to a respective said conductor; and said exposed portion of said ground means to be electrically engaged by a ground electrode of each said protector element upon full insertion to a respective said cavity and adapted to be connected to external ground means, whereby upon connecting respective said conductor to said second contact section of said first contact member and securing a said protector element fully into a respective said cavity, said first contact section of said first contact member is electrically engaged by said active electrode connecting said protector element to said conductor for surge protection of the circuit.

2. The circuit protection module as set forth in claim 1 wherein said ground means is a plate secured to said insertion face of said housing means, said plate including integral annular flanges extending a selected length concentric with respective said cavities and including threaded internal surfaces enabling correspondingly threaded cylindrical portions of said protector elements to be threaded thereinto until said ground electrodes thereof are in electrical engagement with portions, of said ground plate adjacent said cavities, whereby said ground plate secures said protector elements in said housing means.

3. The circuit protection module as set forth in claim 2 wherein said annular flanges extend into said cavities, and said ground electrodes of said protector elements are annular flanges engageable with an adjacent portion of a top surface of said ground plate upon said protector elements being threaded through said annular flanges and achieving full insertion into said cavity.

4. The circuit protection module as set forth in claim 2 wherein said annular flanges extend upwardly from said insertion face of said housing means, and said ground electrodes of said protector elements are annular flanges engageable with leading edges of said annular flanges upon said protector elements being threaded through said annular flanges and achieving full insertion into said cavity.

5. The circuit protection module as set forth in claim 2 wherein said ground plate includes a plurality of mounting holes through which extend corresponding embossments of said insertion face of said housing means enabling staking of said embossments for securing said ground plate to said insertion face.

6. The circuit protection module as set forth in claim 1 further including at least one second contact member initially electrically isolated from a respective said first contact member, each said second contact member including a first contact section disposed below said first contact section of said first contact member and exposed to be engaged thereby upon downward deflection thereof by said protector element electrode, and further including a second contact section adapted to be electrically connected to a portion of said conductor electrically disconnected from said conductor connected to said second contact section of said first contact member, whereby electrical engagement of said second contact member with said first contact member at said first contact section upon protector insertion completes the circuit between said conductor and said conductor portion.

7. The circuit protection module as set forth in claim 1 wherein said housing module includes a lid securable thereto for covering said insertion face and sealing said ground means and said protector elements disposed therein.

8. The circuit protection module as set forth in claim 1 wherein said second contact sections of said first contact members are at least exposed along a conductor-connecting face of said housing means permitting respective said conductors to be electrically connected thereto along said conductor-connecting face.

9. The circuit protection module as set forth in claim 8 wherein said second contact sections extend outwardly from said housing means and define insulation displacement slots whereinto said conductors members are insertable for electrical connection therewith.

10. The circuit protection module as set forth in claim 9 wherein said housing means includes side walls extending beyond said conductor-connecting face providing containment means for said conductor members and for sealant material disposed across said conductor-connecting face for sealing said electrical connections of said conductor members to said second contact sections and for holding said conductor members along said conductor-connecting face.

11. The circuit protection module as set forth in claim 1 wherein said housing means includes means for being attached to a terminal block containing terminals for terminating respective ones of said conductors members, and further includes aperture alignable with corresponding apertures of said terminal block upon being attached thereto, for said conductor members to extend therethrough to be electrically connected to contact means of said terminals.

12. A circuit protection module for interposing along an array of conductors and adapted to receive thereinto and contain protector elements for circuit surge protection electrically connectable to respective circuits of said conductors to provide grounding for voltage surges therealong band being of the type having an active electrode exposed along a bottom thereof and a ground electrode therearound spaced a known distance from said active electrode, comprising:

housing means including cavities extending thereinto from an insertion face thereof and adapted to receive thereinto respective ones of said protector elements, a ground means having an exposed portion adjacent each said cavity and extending along said insertion face and at least to each said cavity, and said housing means further including at least a first contact member retained in each one of said cavities isolated from said ground means;

each said first contact member including first and second contact sections, said first contact section extending upwardly into said cavity and substantially transversely thereacross on a bendable spring arm, thereby being adapted to be engaged by an active electrode of a said protector element and deflected downwardly upon full insertion of a said protector element in said cavity and said second contact section adapted to be electrically connected to a respective said conductor;

said exposed portion of said ground means to be electrically engaged by a ground electrode of each said protector element upon full insertion into a respective said cavity and adapted to be connected to external ground means; and a ground contact member disposed in at least one said cavity including a spring arm initially spring biased against said first contact section of said first contact member and deflectable out of engagement upon full insertion of a said protector element into said cavity, said ground contact member including a ground section in continuous engagement with said ground means, whereby upon connecting a respective said conductor to said second contact section of said first contact member and securing a said protector element fully into a respective said cavity, said first contact section of said first contact member is electrically engaged by said active electrode connecting said protector element to said conductor for surge protection of the circuit, and said first contact member is connected to ground in the absence of a fully inserted protector element in said cavity.

* * * * *

UNITED STATES PATENT AND TRADEMARK OFFICE
CERTIFICATE OF CORRECTION

PATENT NO. : 5,296,646
DATED : March 22, 1994
INVENTOR(S) : Harry M. Capper, et. al.

It is certified that error appears in the above-indentified patent and that said Letters Patent is hereby corrected as shown below:

Column 12, claim 9, line 36, delete "members".

Column 12, claim 10, line 41, and line 8 substitute --said conductors-- for "said conductor members".--

Column 12, claim 11, line 45, and line 7, substitute --said conductors-- for "said conductor members".--

Signed and Sealed this

Nineteenth Day of July, 1994

Attest:

BRUCE LEHMAN

Attesting Officer

Commissioner of Patents and Trademarks